US012257665B2

United States Patent
Cherian et al.

(10) Patent No.: US 12,257,665 B2
(45) Date of Patent: *Mar. 25, 2025

(54) MACHINE VISION AS INPUT TO A CMP PROCESS CONTROL ALGORITHM

(71) Applicant: Applied Materials, Inc., Santa Clara, CA (US)

(72) Inventors: Benjamin Cherian, San Jose, CA (US); Jun Qian, Sunnyvale, CA (US); Nicholas A. Wiswell, Sunnyvale, CA (US); Dominic J. Benvegnu, La Honda, CA (US); Boguslaw A. Swedek, Morgan Hill, CA (US); Thomas H. Osterheld, Mountain View, CA (US)

(73) Assignee: Applied Materials, Inc., Santa Clara, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/163,835

(22) Filed: Feb. 2, 2023

(65) Prior Publication Data

US 2023/0182258 A1 Jun. 15, 2023

Related U.S. Application Data

(63) Continuation of application No. 16/554,427, filed on Aug. 28, 2019, now Pat. No. 11,577,356.
(Continued)

(51) Int. Cl.
*B24B 37/013* (2012.01)
*G06N 3/084* (2023.01)

(52) U.S. Cl.
CPC .......... *B24B 37/013* (2013.01); *G06N 3/084* (2013.01)

(58) Field of Classification Search
None
See application file for complete search history.

(56) References Cited

U.S. PATENT DOCUMENTS 5,897,378 A 4/1999 Eriguchi
5,899,792 A 5/1999 Yagi
(Continued)

FOREIGN PATENT DOCUMENTS

CN 101903025 12/2010
CN 102626895 8/2012
(Continued)

OTHER PUBLICATIONS

Office Action in Korean Appln. No. 10-2021-7011806, dated May 31, 2024, 11 pages (with English summary).
(Continued)

*Primary Examiner* — Bryan R Muller
*Assistant Examiner* — Dana Lee Poon
(74) *Attorney, Agent, or Firm* — Fish & Richardson P.C.

(57) ABSTRACT

During chemical mechanical polishing of a substrate, a signal value that depends on a thickness of a layer in a measurement spot on a substrate undergoing polishing is determined by a first in-situ monitoring system. An image of at least the measurement spot of the substrate is generated by a second in-situ imaging system. Machine vision processing, e.g., a convolutional neural network, is used to determine a characterizing value for the measurement spot based on the image. Then a measurement value is calculated based on both the characterizing value and the signal value.

7 Claims, 5 Drawing Sheets

Related U.S. Application Data

(60) Provisional application No. 62/735,772, filed on Sep. 24, 2018.

(56) References Cited

U.S. PATENT DOCUMENTS

| | | | |
|---|---|---|---|
| 6,563,308 B2* | 5/2003 | Nagano | G01B 7/105 |
| | | | 324/229 |
| 6,603,874 B1 | 8/2003 | Stern et al. | |
| 6,633,831 B2* | 10/2003 | Nikoonahad | G03F 7/70633 |
| | | | 702/155 |
| 6,673,637 B2* | 1/2004 | Wack | G03F 7/70708 |
| | | | 257/E21.53 |
| 6,712,927 B1 | 3/2004 | Grimbergen et al. | |
| 6,959,255 B2 | 10/2005 | Ye et al. | |
| 7,001,243 B1 | 2/2006 | Yi et al. | |
| 7,076,320 B1 | 7/2006 | Phan et al. | |
| 9,011,202 B2 | 4/2015 | David | |
| 10,012,494 B2 | 7/2018 | David et al. | |
| 10,478,937 B2 | 11/2019 | Tang et al. | |
| 10,565,701 B2 | 2/2020 | Benvegnu et al. | |
| 10,732,607 B2 | 8/2020 | Cherian | |
| 11,577,356 B2 | 2/2023 | Cherian et al. | |
| 2002/0013058 A1 | 1/2002 | Tang | |
| 2002/0164925 A1* | 11/2002 | Swedek | B24B 37/013 |
| | | | 451/6 |
| 2004/0067718 A1 | 4/2004 | Shimizu et al. | |
| 2004/0259472 A1 | 12/2004 | Chalmers et al. | |
| 2005/0054268 A1 | 3/2005 | Kistler et al. | |
| 2005/0287929 A1* | 12/2005 | Swedek | B24B 49/02 |
| | | | 451/5 |
| 2006/0009128 A1* | 1/2006 | Hanawa | B24B 49/105 |
| | | | 451/8 |
| 2006/0025048 A1* | 2/2006 | Billig | B24B 49/12 |
| | | | 451/8 |
| 2006/0025052 A1* | 2/2006 | Birang | B24B 49/12 |
| | | | 451/526 |
| 2006/0048697 A1* | 3/2006 | Houge | B24B 37/044 |
| | | | 117/11 |
| 2006/0063469 A1* | 3/2006 | Talieh | B24B 21/08 |
| | | | 451/41 |
| 2007/0042675 A1 | 2/2007 | Benvegnu et al. | |
| 2007/0077671 A1 | 4/2007 | David et al. | |
| 2007/0224915 A1* | 9/2007 | David | B24B 37/013 |
| | | | 451/6 |
| 2008/0031510 A1* | 2/2008 | Jung | H01L 21/67288 |
| | | | 382/149 |
| 2009/0130956 A1 | 5/2009 | Ohta et al. | |
| 2009/0149417 A1 | 6/2009 | Ossovskaya et al. | |
| 2013/0052916 A1* | 2/2013 | David | B24B 37/013 |
| | | | 451/6 |
| 2014/0024291 A1* | 1/2014 | Zhang | H01L 22/12 |
| | | | 451/6 |
| 2014/0206259 A1* | 7/2014 | Benvegnu | B24B 49/12 |
| | | | 451/6 |
| 2015/0120242 A1* | 4/2015 | David | H01L 22/26 |
| | | | 702/172 |
| 2015/0147940 A1 | 5/2015 | Benvegnu et al. | |
| 2018/0107928 A1* | 4/2018 | Zhang | G06N 3/082 |
| 2020/0094370 A1 | 3/2020 | Cherian et al. | |

FOREIGN PATENT DOCUMENTS

| | | |
|---|---|---|
| CN | 105765707 | 7/2016 |
| CN | 107427987 | 12/2017 |
| CN | 108051364 | 5/2018 |
| CN | 108292613 | 7/2018 |
| JP | H03-049846 | 3/1991 |
| JP | H10-166262 | 6/1998 |
| JP | H10-294297 | 11/1998 |
| JP | 2000-233369 | 8/2000 |
| JP | 2001-287159 | 10/2001 |
| JP | 2004-119850 | 4/2004 |
| JP | 2005-517290 | 6/2005 |
| JP | 2005-518614 | 6/2005 |
| JP | 2007-266235 | 10/2007 |
| JP | 2008-137103 | 6/2008 |
| JP | 2009-129970 | 6/2009 |
| JP | 2010-067918 | 3/2010 |
| KR | 2014-0140598 | 12/2014 |
| KR | 10-1593927 | 2/2016 |
| TW | 200532904 | 10/2005 |
| TW | 201343323 | 11/2013 |
| TW | 201826371 | 7/2018 |
| WO | WO 2003/066284 | 8/2003 |
| WO | WO 2007/024807 | 3/2007 |
| WO | WO 2018/071137 | 4/2018 |

OTHER PUBLICATIONS

International Search Report and Written Opinion in International Appln. No. PCT/US2019/048636, dated Dec. 12, 2019, 12 pages.

McNeil, "Scatterometry Applied to Microelectronics Processing," presented at LEOS Summer Topical Meetings, Aventura, FL, Jul. 24-28, 2000; IEEE, Aug. 2002. 37-38.

Office Action in Chinese Appln. No. 201980066820.1, dated Dec. 2, 2022, 20 pages (with English translation).

Office Action in Japanese Appln. No. 2021-515551, dated Jul. 4, 2023, 9 pages (with English translation).

* cited by examiner

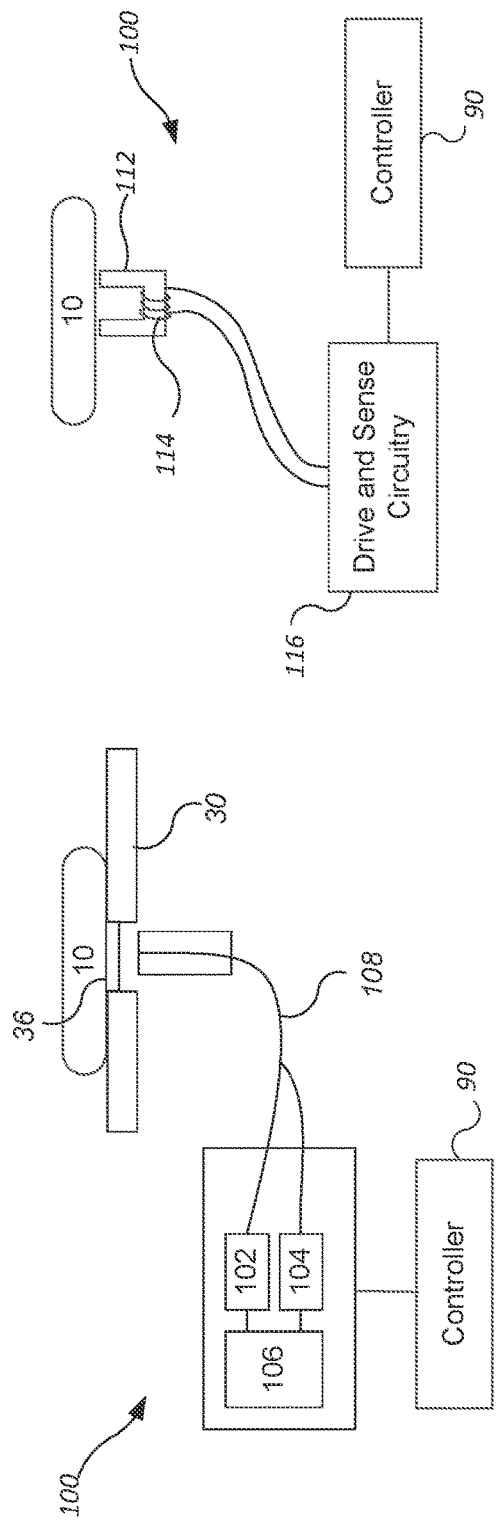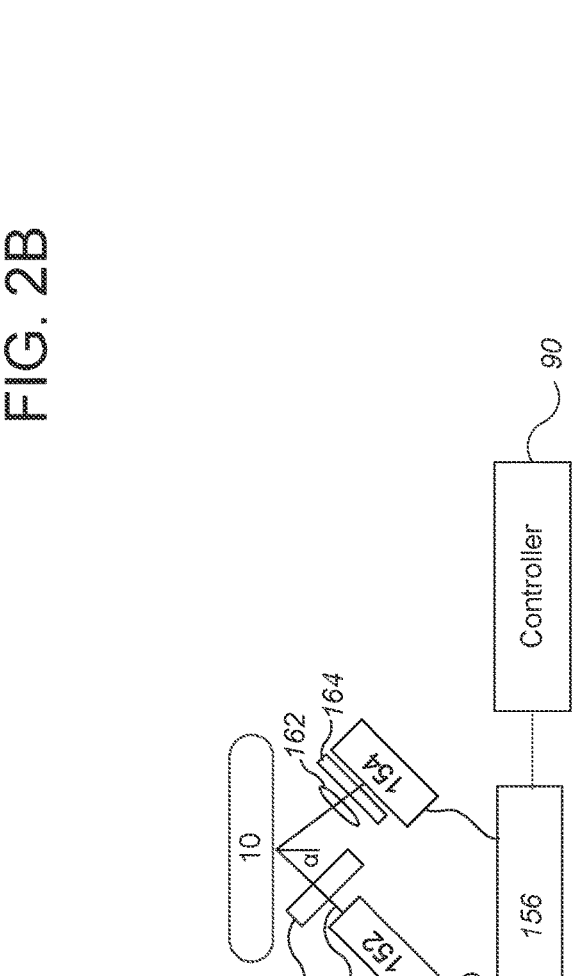

MACHINE VISION AS INPUT TO A CMP PROCESS CONTROL ALGORITHM

CROSS-REFERENCE TO RELATED APPLICATIONS

This application is a continuation of U.S. application Ser. No. 16/554,427, filed Aug. 28, 2019, which claims priority to U.S. Provisional Application Ser. No. 62/735,772, filed Sep. 24, 2018, the disclosure of which is incorporated by reference.

TECHNICAL FIELD

The present disclosure relates to optical monitoring of a substrate, e.g., during processing such as chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For some applications, the filler layer is planarized until the top surface of a patterned layer is exposed. For example, a conductive filler layer can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, the filler layer is planarized until a predetermined thickness is left over an underlying layer. For example, a dielectric layer deposited can be planarized for photolithography.

Chemical mechanical polishing (CMP) is one accepted method of planarization. This planarization method typically requires that the substrate be mounted on a carrier head. The exposed surface of the substrate is typically placed against a rotating polishing pad with a durable roughened surface. The carrier head provides a controllable load on the substrate to push it against the polishing pad. A polishing liquid, such as a slurry with abrasive particles, is typically supplied to the surface of the polishing pad.

One problem in CMP is using an appropriate polishing rate to achieve a desirable profile, e.g., a substrate layer that has been planarized to a desired flatness or thickness, or a desired amount of material has been removed. Variations in the initial thickness of a substrate layer, the slurry distribution, the polishing pad condition, the relative speed between the polishing pad and a substrate, and the load on a substrate can cause variations in the material removal rate across a substrate, and from substrate to substrate. These variations cause variations in the time needed to reach the polishing endpoint and the amount removed. Therefore, it may not be possible to determine the polishing endpoint merely as a function of the polishing time, or to achieve a desired profile merely by applying a constant pressure.

In some systems, a substrate is monitored in-situ during polishing, e.g., by an optical monitoring system or eddy current monitoring system. Thickness measurements from the in-situ monitoring system can be used to adjust pressure applied to the substrate to adjust the polishing rate and reduce within-wafer non-uniformity (WIWNU).

SUMMARY

A polishing system includes a support to hold a polishing pad, a carrier head to hold a substrate in contact with the polishing pad, a motor to generate relative motion between the support and the carrier head, a first in-situ monitoring system to generate a signal that depends on a thickness of a layer in a measurement spot on the substrate, a second in-situ imaging system to generate an image of at least the measurement spot of the substrate at substantially the same time as the in-situ monitoring system generates the signal for the measurement spot on the substrate, and a controller. The controller is configured to receive the image from the second in-situ imaging system and determine a characterizing value for the measurement spot based on the image using machine vision processing, receive the signal from the in-situ monitoring system, generate a measurement value based on both the characterizing value and the signal value, and at least one of halt polishing of the substrate or adjust a polishing parameter based on the measurement value.

In another aspect, a computer program product for controlling processing of a substrate includes instructions for causing one or more processors to receive from a first in-situ monitoring system a signal value that depends on a thickness of a layer in a measurement spot on a substrate undergoing polishing, receive image data for at least the measurement spot of the substrate from a second in-situ imaging system, determine a characterizing value for the measurement spot based on the image using machine vision processing, generate a measurement value based on both the characterizing value and the signal value, and at least one of halt polishing of the substrate or adjust a polishing parameter based on the measurement value.

Implementations may include one or more of the following features.

The machine vision processing may include processing the image with an artificial neural network. The artificial neural network may be a convolutional neural network. The controller may be configured to train the artificial neural network by backpropagation using training data including images and known characterizing values for the images.

The first in-situ monitoring system may include a spectrographic monitoring system to generate a measured spectrum for the measurement spot. The artificial neural network may be is configured to determine a classification of a portion of the substrate corresponding to the measurement spot. The classification may correspond to a type of structure on the substrate. The type of structure may include at least one of an array, a scribe line, a periphery, and a contact pad. One of a plurality of libraries of reference spectra may be selected based on the classification.

The first in-situ monitoring system may include an eddy current monitoring system to generate a signal value for the measurement spot. The artificial neural network may be configured to determine a geometry value for a feature that affects current flow in the measurement spot. The geometry value may include at least one of a distance, size or orientation.

A portion of the image data corresponding to the measurement spot may be determined. Image data from the second in-situ imaging system may be synchronized with the signal from the first in-situ monitoring system.

Certain implementations may have one or more of the following advantages. Process control techniques can target the performance sensitive portions of a die. The thickness of a layer on a substrate can be measured more accurately and/or more quickly. Within-wafer thickness non-uniformity and wafer-to-wafer thickness non-uniformity (WIWNU and WTWNU) may be reduced, and reliability of an endpoint system to detect a desired processing endpoint may be improved. Post CHIP metrics can be based on on yield and/or performance sensitive portions of products, as opposed to average die thickness (which may include areas of the die that are irrelevant to product performance).

The details of one or more embodiments are set forth in the accompanying drawings and the description below. Other features, aspects, and advantages will become apparent from the description, the drawings, and the claims.

BRIEF DESCRIPTION OF THE DRAWINGS

FIG. 2A is a schematic illustration of an in-situ optical monitoring system.

FIG. 2B is a schematic illustration of an in-situ eddy current monitoring system.

FIG. 4 illustrates a schematic illustration of a line scan imaging system.

Like reference numbers and designations in the various drawings indicate like elements.

DETAILED DESCRIPTION

Various techniques, e.g., eddy current monitoring and optical monitoring, can be used to monitor a substrate during processing. Such monitoring techniques can proceed in a two stage manner. First, the raw signal from the monitoring system, e.g., a measured spectrum from a spectrophotometer or a voltage from an eddy current monitoring system, is converted to a more useful form of measurement, e.g., an index representing progress through polishing or a thickness value. The sequence of measurements over time as processing progresses can then be monitored for use in process control. For example, a function can be fit to the sequence of measurements, and the time at which the function is projected to reach a threshold value can be used to trigger the polishing endpoint or to control other polishing parameters.

If a sensor of the monitoring system sweeps across the substrate, measurements can made at different positions on the substrate. Consequently, the measurements can be made at different regions of the substrate, e.g., within a die versus in a scribe line, or at different regions within a die, e.g., an array, a contact pad, etc. These different regions can have different properties and provide different raw signals. It would be useful to determine the type of region in which a measurement is made in order to properly convert the raw signal into a useful measurement.

Although radial positions of the measurements can be determined, e.g., due to rotational slippage of the substrate relative to carrier head, the angular position of a measurement on the substrate may not be known at all. Consequently, commercialized in-situ monitoring techniques have not taken into account where in a die the measurement is made when converting the raw signal into a useful measurement.

Moreover, although some monitoring systems perform filtering to reject some raw signals, e.g., rejecting a spectrum based on the shape of the spectrum, such techniques do not use information from the surrounding portion of the substrate.

However, images collected by an in-situ imager can be processed by a machine learning technique, e.g., a convolutional neural network, to determine a characteristic of the substrate where a measurement is being performed by another monitoring system. This characteristic can be, for example, the type of region, e.g., scribe line, array, periphery, where the measurement is being made, or a relative orientation and/or distance of various features, e.g., guard rings, to the location of the measurement. The characteristic can then be fed as an input to the in-situ monitoring system to influence the conversion of the raw signal to the measurement.

Figure 1:
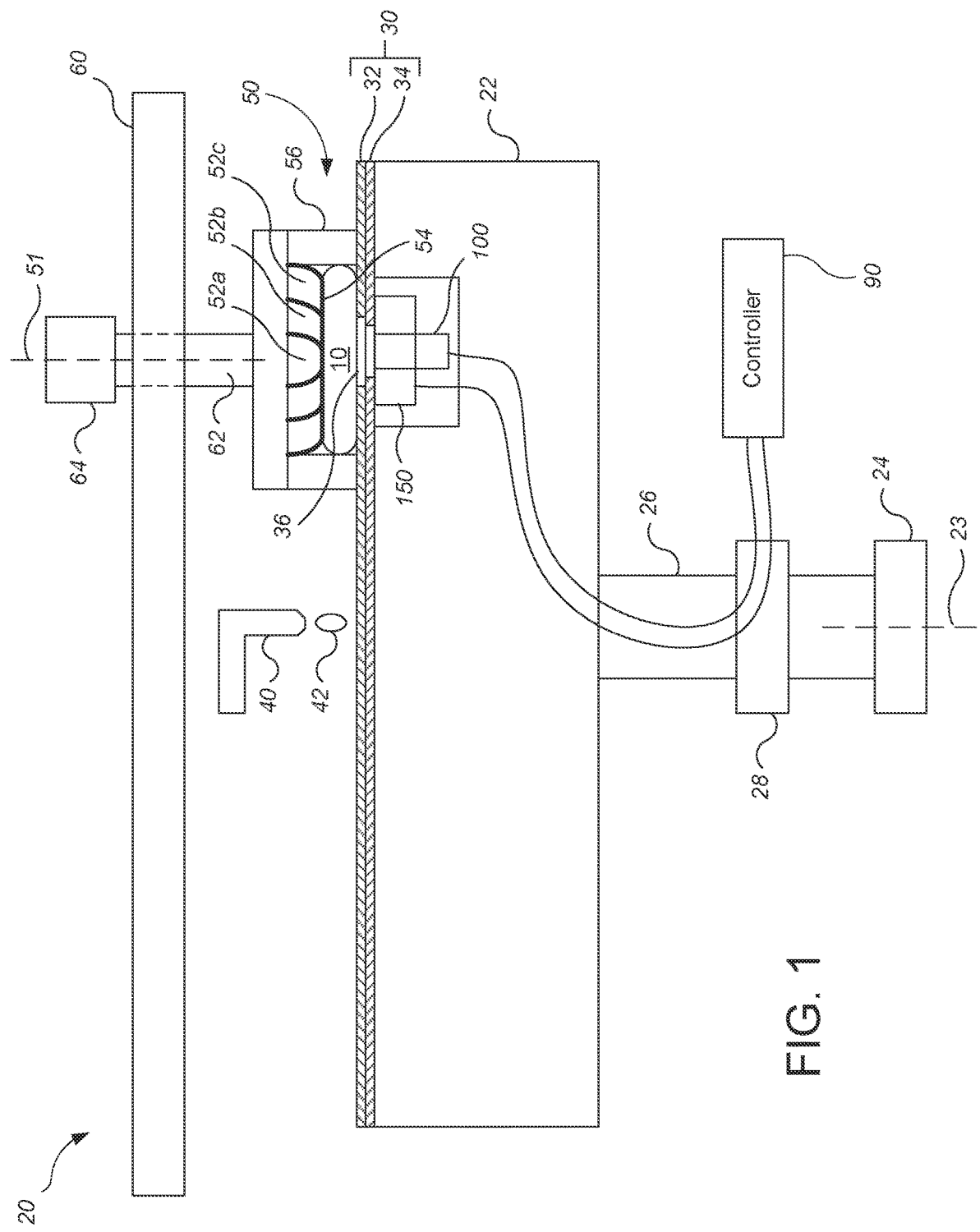
FIG. 1 is a schematic cross-sectional view of an example of a polishing apparatus.

FIG. 1 illustrates an example of a polishing apparatus 20. The polishing apparatus 20 can include a rotatable disk-shaped platen 22 on which a polishing pad 30 is situated. The platen is operable to rotate about an axis 23. For example, a motor 24 can turn a drive shaft 26 to rotate the platen 22.

The polishing pad 30 can be detachably secured to the platen 22, for example, by a layer of adhesive. The polishing pad 30 can be a two-layer polishing pad with an outer polishing layer 32 and a softer backing layer 34. A window 36 can be formed in the polishing pad 30.

The polishing apparatus 20 can include a polishing liquid supply port 40 to dispense a polishing liquid 42, such as an abrasive slurry, onto the polishing pad 30. The polishing apparatus 20 can also include a polishing pad conditioner to abrade the polishing pad 30 to maintain the polishing pad 30 in a consistent abrasive state.

A carrier head 50 is operable to hold a substrate 10 against the polishing pad 30. Each carrier head 50 also includes a plurality of independently controllable pressurizable chambers, e.g., three chambers 52a-52c, which can apply independently controllable pressurizes to associated zones on the substrate 10. The center zone on the substrate can be substantially circular, and the remaining zones can be concentric annular zones around the center zone.

The chambers 52a-52c can be defined by a flexible membrane 54 having a bottom surface to which the substrate 10 is mounted. The carrier head 50 can also include a retaining ring 56 to retain the substrate 10 below the flexible membrane 54. Although only three chambers are illustrated in FIG. 1 for ease of illustration, there could be a single chamber, two chambers, or four or more chambers, e.g., five chambers. In addition, other mechanisms to adjust the pressure applied to the substrate, e.g., piezoelectric actuators, could be used in the carrier head 50.

Each carrier head 50 is suspended from a support structure 60, e.g., a carousel or track, and is connected by a drive shaft 62 to a carrier head rotation motor 64 so that the carrier head can rotate about an axis 51. Optionally each carrier head 50 can oscillate laterally, e.g., on sliders on the carousel, by motion along the track; or by rotational oscillation of the carousel itself. In operation, the platen 22 is rotated about its central axis 23, and the carrier head 50 is rotated about its central axis 51 and translated laterally across the top surface of the polishing pad 30.

The polishing apparatus also includes a first in-situ monitoring system 100, and a second in-situ imaging system 150. Together, the first in-situ monitoring system 100 and the second in-situ imaging system 150 can be used to control the polishing parameters, e.g., the pressure in one or more of the chambers 52a-52c, and/or to detect a polishing endpoint and halt polishing.

The first in-situ monitoring system 100 includes a sensor 100a (see FIG. 3) that generates a raw signal that depends on the thickness of the layer being polished. The first in-situ monitoring system 100 can be, for example, an eddy current monitoring system or an optical monitoring system, e.g., a spectrographic monitoring system.

The sensor can be configured to sweep across the substrate. For example, the sensor can be secured to and rotate with the platen 22 such that the sensor sweeps in arc across the substrate with each rotation of the platen.

Referring to FIG. 2A, as an optical monitoring system, the first in-situ monitoring system 100 can include a light source 102, a light detector 104, and circuitry 106 for sending and receiving signals between a controller 90, e.g., a computer, and the light source 102 and light detector 104. One or more optical fibers can be used to transmit the light from the light source 102 to the window 36, and to transmit light reflected from the substrate 10 to the detector 104. For example, a bifurcated optical fiber 108 can be used to transmit the light from the light source 102 to the window 36 and back to the detector 104. In this implementation, an end of the bifurcated fiber 108 can provide the sensor that sweeps across the substrate. If the optical monitoring system is a spectrographic system, the light source 102 can be operable to emit white light and the detector 104 can be a spectrometer.

Referring to FIG. 2B, as an eddy current monitoring system, the first in-situ monitoring system 100 can include a magnetic core 112 and at least one coil 114 wound around a portion of the core 112. Drive and sense circuitry 116 is electrically connected to the coil 114. The drive and sense circuitry 116 can apply an AC current to the coil 114, which generates a magnetic field between two poles of the core 112 that can pass into the substrate 10. In this implementation, the core 112 and coil 114 can provide the sensor that sweeps across the substrate. The circuitry 116 can include a capacitor connected in parallel with the coil 114. Together the coil 114 and the capacitor can form an LC resonant tank. When the magnetic field reaches a conductive layer, the magnetic field can pass through and generate a current (if the layer is a loop) or create an eddy-current (if the layer is a sheet). This modifies the effective impedance of the LC circuit. The drive and sense circuitry 116 can detect the change in effective impedance, and generate a signal that can be sent to the controller 90.

In either case, the output of the circuitry 106 or 116 can be a digital electronic signal that passes through a rotary coupler 28, e.g., a slip ring, in the drive shaft 26 to the controller 90 (see FIG. 1). Alternatively, the circuitry 106 or 116 could communicate with the controller 90 by a wireless signal. Some or all of the circuitry 106 or 116 can be installed in the platen 22.

The controller 90 can be a computing device that includes a microprocessor, memory and input/output circuitry, e.g., a programmable computer. Although illustrated with a single block, the controller 90 can be a networked system with functions distributed across multiple computers.

As the controller 90 can perform a portion of the processing of the signal, e.g., conversion of the "raw" signal to the usable measurement, the controller 90 can be considered to provide a portion of the first monitoring system.

Figure 3:
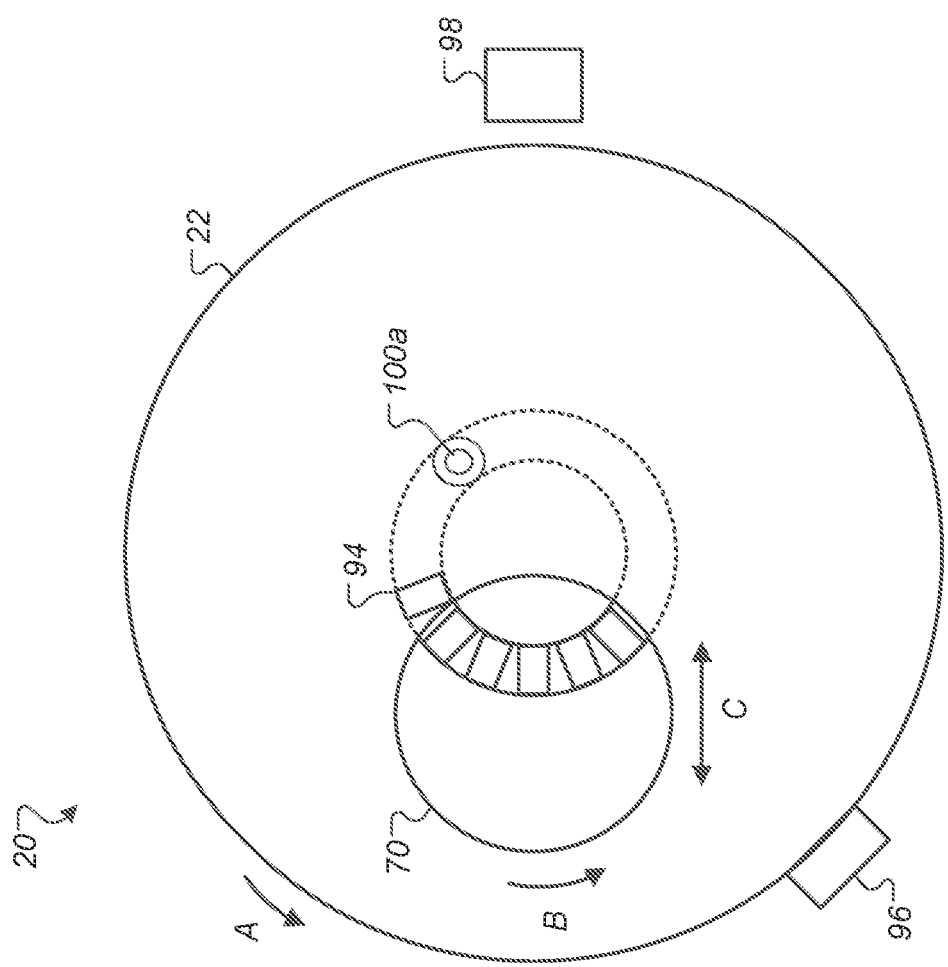
FIG. 3 is a schematic top view of the polishing apparatus.

As shown by in FIG. 3, due to the rotation of the platen (shown by arrow A), as the sensor 100a travels below the carrier head, the first in-situ monitoring system makes measurements at a sampling frequency. As a result, the measurements are taken at locations 94 in an arc that traverses the substrate 10 (the number of points is illustrative; more or fewer measurements can be taken than illustrated, depending on the sampling frequency). The substrate can also be rotating (shown by arrow B) and oscillating radially (shown by arrow C).

The polishing system 20 can include a position sensor 96, such as an optical interrupter, to sense when the sensor 100a of the first in-situ monitoring system 100 is underneath the substrate 10 and when the sensor 100a is off the substrate 10. For example, the position sensor 96 can be mounted at a fixed location opposite the carrier head 70. A flag 98 can be attached to the periphery of the platen 22. The point of attachment and length of the flag 98 is selected so that it can signal the position sensor 96 when the sensor 100a sweeps underneath the substrate 10.

Alternately or in addition, the polishing system 20 can include an encoder to determine the angular position of the platen 22.

Over one rotation of the platen, spectra are obtained from different positions on the substrate 10. In particular, some spectra can be obtained from locations closer to the center of the substrate 10 and some can be obtained from locations closer to the edge. The controller 90 can be configured to calculate a radial position (relative to the center of the substrate 10) for each measurement from a scan based on timing, motor encoder information, platen rotation or position sensor data, and/or optical detection of the edge of the substrate and/or retaining ring. The controller can thus associate the various measurements with the various zones on the substrate. In some implementations, the time of measurement of can be used as a substitute for the exact calculation of the radial position.

The in-situ imaging system 150 is positioned to generate an image of substantially the same portion of the substrate 10 that the first in-situ monitoring system 100 is measuring. In short, the camera of the imaging system is co-located with the sensor of the in-situ monitoring system 100.

Referring to FIG. 4, the in-situ imaging system 150 can include a light source 152, a light detector 154, and circuitry 156 for sending and receiving signals between the controller 90, the light source 152, and the light detector 154.

The light source 152 can be operable to emit white light. In one implementation, the white light emitted includes light having wavelengths of 200-800 nanometers. A suitable light source is an array of white-light light emitting diodes (LEDs), or a xenon lamp or a xenon mercury lamp. The light source 152 is oriented to direct light 158 onto the exposed surface of the substrate 10 at a non-zero angle of incidence α. The angle of incidence a can be, for example, about 30° to 75°, e.g., 50°.

The light source 152 can illuminate a substantially linear elongated region. The elongated region can span the width of the substrate 10. The light source 152 can include optics, e.g., a beam expander, to spread the light from the light source into an elongated region. Alternatively or in addition, the light source 152 can include a linear array of light sources. The light source 152 itself, and the region illuminated on the substrate, can be elongated and have a longitudinal axis parallel to the surface of the substrate.

A diffuser 160 can be placed in the path of the light 168, or the light source 152 can include a diffuser, to diffuse the light before it reaches the substrate 10.

The detector 154 is a camera, e.g., a color camera, that is sensitive to light from the light source 152. The camera includes an array of detector elements. For example, the camera can include a CCD array. In some implementations, the array is a single row of detector elements. For example, the camera can be a linescan camera. The row of detector elements can extend parallel to the longitudinal axis of the elongated region illuminated by the light source 152. Where the light source 152 includes a row of light emitting elements, the row of detector elements can extend along a first axis parallel to the longitudinal axis of the light source 152. A row of detector elements can include 1024 or more elements.

The detector 154 is configured with appropriate focusing optics 162 to project a field of view of the substrate onto the array of detector elements of the detector 154. The field of view can be long enough to view the entire width of the substrate 10, e.g., 150 to 300 mm long. The detector 164 can be also be configured such that the pixel width is comparable to the pixel length. For example, an advantage of a linescan camera is its very fast frame rate. The frame rate can be at least 5 kHz. The frame rate can be set at a frequency such that as the imaged area scans across the substrate 10, the pixel width is comparable to the pixel length, e.g., equal to or less than about 0.3 mm.

The light source 152 and the light detector 154 can be supported in a recess in the platen, e.g., the same recess that holds the sensor of the first in-situ monitoring system 100.

A possible advantage of having a line-scan camera and light source that move together across the substrate is that, e.g., as compared to a conventional 2D camera, the relative angle between the light source and the camera remains constant for different positions across the wafer. Consequently, artifacts caused by variation in the viewing angle can be reduced or eliminated. In addition, a line scan camera can eliminate perspective distortion, whereas a conventional 2D camera exhibits inherent perspective distortion, which then needs to be corrected by an image transformation.

Optionally a polarizing filter 164 can be positioned in the path of the light, e.g., between the substrate 10 and the detector 154. The polarizing filter 164 can be a circular polarizer (CPL). A typical CPL is a combination of a linear polarizer and quarter wave plate. Proper orientation of the polarizing axis of the polarizing filter 164 can reduce haze in the image and sharpen or enhance desirable visual features.

The controller 90 assembles the individual image lines from the light detector 154 into a two-dimensional image. The light detector 154 can be a color camera with separate detector elements, e.g., for each of red, blue and green, in which case the controller 90 assembles the individual image lines from the light detector 154 into a two-dimensional color image. The two-dimensional color image can include a monochromatic image 204, 206, 208 for each color channel, e.g., for each of the red, blue and green color channels.

Figure 5:
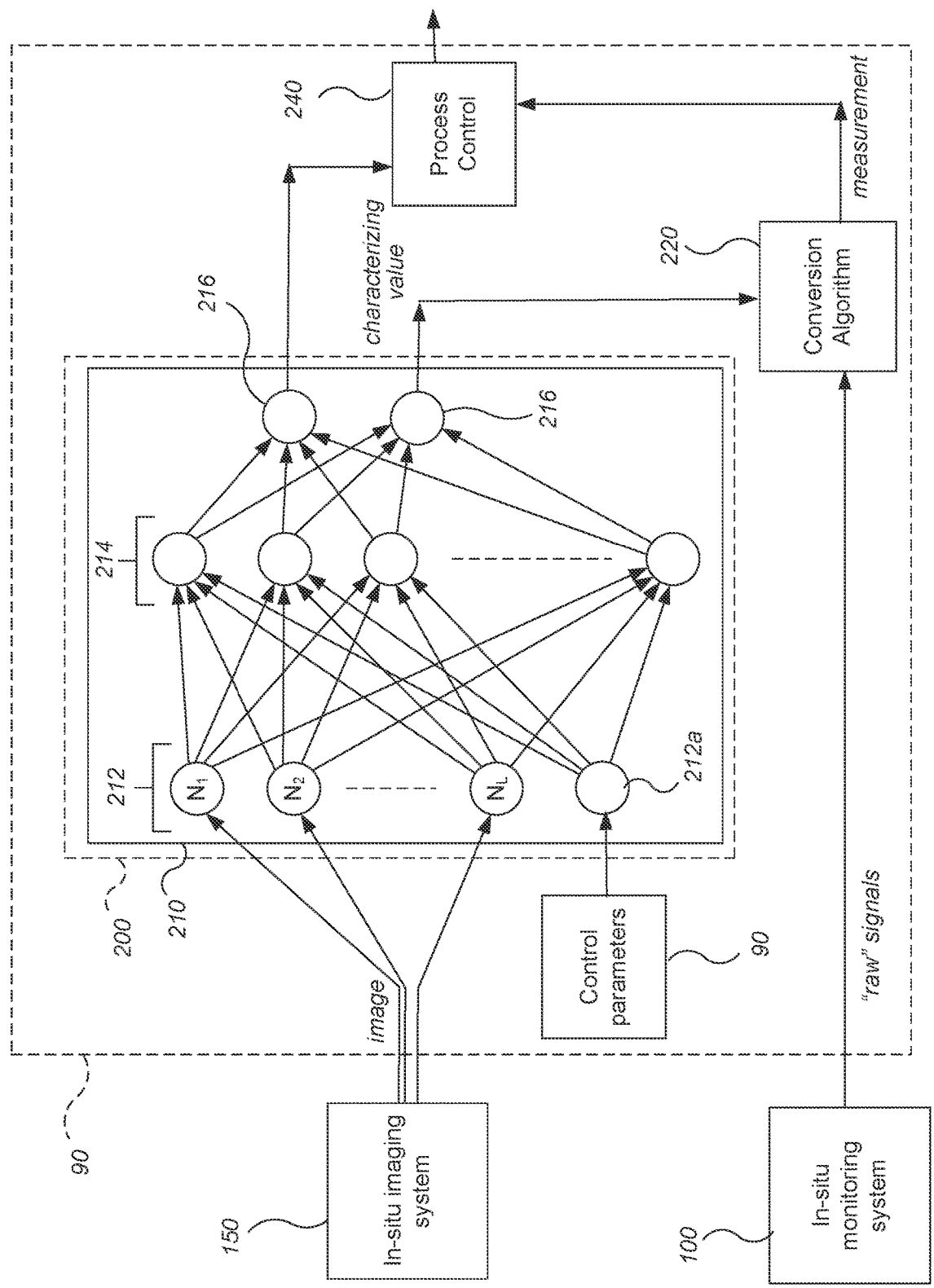
FIG. 5 illustrates a neural network used as part of the controller for the polishing apparatus.

Referring to FIG. 5, the controller 90 can convert the raw signal from the in-situ monitoring system into a useful measurement. The controller 90 uses both the signal from the first in-situ monitoring system 100 and image data from the second in-situ imaging system 150 to calculate the measurement. The images collected from the in-situ imaging system 150 can be synchronized with the data stream collected from the first in-situ monitoring system 100

In particular, the controller 90 feeds the image from the in-situ imaging system 150 into a machine vision system 200 that is configured to derive a characterizing value for the portion of substrate being measured by the first in-situ monitoring system 100. The machine vision system can include, for example, a neural network 210. The neural network 210 can be a convolutional neural network.

The neural network 210 includes a plurality of input nodes 212, e.g., an input node 212 for each pixel in the image from the in-situ imaging system 150. These can include input nodes $N_1, N_2 \ldots N_L$. The neural network 210 also includes a plurality of hidden nodes 214 (also called "intermediate nodes" below), and at least one output node 216 that will generate at least one characterizing value.

In general, a hidden node 214 outputs a value that a non-linear function of a weighted sum of the values from the nodes to which the hidden node is connected.

For example, the output of a hidden node 214, designated node k, can be expressed as:

$$\tanh(0.5 * a_{k1}(I_1) + a_{k2}(I_2) + \ldots + a_{kM}(I_M) + b_k) \qquad \text{Equation 1}$$

where tanh is the hyperbolic tangent, $a_{kx}$, is a weight for the connection between the $k^{th}$ intermediate node and the $x^{th}$ input node (out of M input nodes), and $I_M$ is the value at the $M^{th}$ input node. However, other non-linear functions can be used instead of tanh, such as a rectified linear unit (ReLU) function and its variants.

The architecture of the neural network 210 can vary in depth and width. Although the neural network 210 is shown with a single column of intermediate nodes 214, as a practical matter the neural network would include many columns, which could have various kinds of connections. The convolutional neural network can perform multiple iterations of convolution and pooling, followed by classification.

The neural network 210 can be trained, e.g., in a training mode using backpropagation with sample images and sample characterizing values. Thus, in operation, the machine vision system 200 generates a characterizing value based on the image from the in-situ imaging system 150. This can be performed for each value of the "raw signal" received from the in-situ monitoring system 100.

A raw signal from the in-situ monitoring system 100 and the characterizing value that is synchronized with the raw signal (e.g., corresponding to the same spot on the substrate), are input into a conversion algorithm module 220. The conversion algorithm module 220 calculates a measurement value based on the characterizing value and the raw signal.

The measurement value is typically the thickness of the outer layer, but can be a related characteristic such as thickness removed. In addition, the measurement value can be a more generic representation of the progress of the substrate through the polishing process, e.g., an index value representing the time or number of platen rotations at which the measurement would be expected to be observed in a polishing process that follows a predetermined progress.

The measurement value can be fed to process control sub-system 240 to adjust the polishing process, e.g., detect a polishing endpoint and halt polishing and/or adjust polishing pressures during the polishing process to reduce polishing non-uniformity, based on the series of measurement values. The process control module 240 can output processing parameters, e.g., a pressure for a chamber in the carrier head and/or a signal to halt polishing.

Figure 6:
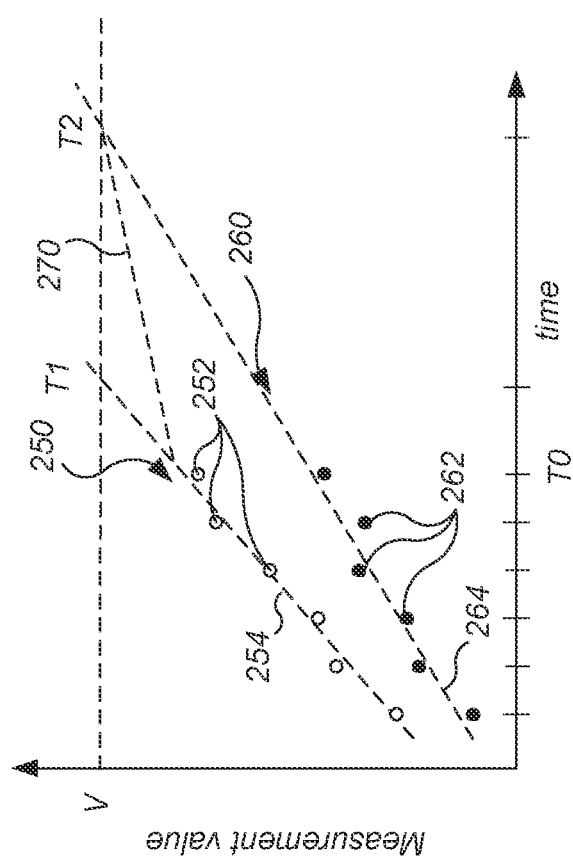
FIG. 6 illustrates a graph of measurement values over time.

For example, referring to FIG. 6, a first function 254 can be fit to the sequence 250 of measurement values 252 for a first zone, and a second function 264 can be fit to the sequence 260 of characteristic values 262 for a second zone. The process controller 240 can calculate the times T1 and T2 at which the first and second functions are projected to reach a target value V, and calculate an adjusted processing parameter, e.g., an adjusted carrier head pressure, that will cause one of the zones to be polished at a revised rate (shown by line 270) such that the zones reach the target at approximately the same time.

A polishing endpoint can be triggered by the process controller 240 at the time that a function indicates the characteristic values reaches the target value V.

In some implementations, multiple measurement values can be combined, either at the conversion algorithm module 220 or the process control module 240. For example, if the system generates multiple measurement values from a single scan of the sensor across the substrate, the conversion algorithm module 220 could combine multiple measurements from the single scan to generate either a single measurement per scan or a single measurement per radial zone on the substrate. However, in some implementations, a measurement value is generated for each location 94 for which the sensor 100*a* generates a raw signal value (see FIG. 3).

In some implementations, the neural network 210 generates multiple characterizing values at multiple output nodes 216. The additional characterizing value(s), i.e., beyond the characterizing value that represents a thickness measurement, can represent other characteristics of the substrate, e.g., wafer orientation, type of structures (e.g., memory array, central processing units) on the wafer. The additional characterizing value(s) can be fed into the process control 240.

EXAMPLE 1

The in-situ monitoring system 100 can be a spectrographic monitoring system. The same window 36 can be used by the sensor of the spectrographic monitoring system and the in-situ imaging system 150. A window of data from the line scan camera of the in-situ imaging system 150 that is centered around the time of acquisition of the spectrum by the in-situ monitoring system 100 can be used to reconstruct a two dimensional image of the portion of the substrate 10 from which the spectrum was collected.

The machine vision system 200 can include a convolutional neural network (CNN) 210. To train the neural network 210, a series of the images from one or more reference substrates can be manually identified with a relevant class (e.g., array, scribe line, periphery, contact pad, etc.). Assigning a classification to the image is sometimes termed "annotation." The images and the classes from the reference substrates can then be input to the neural network in a training mode, e.g., using backpropagation, to train the neural network 210 as an image classifier. Note that such image classifiers can be trained with a relatively small number of annotated images via the use of transfer learning in which a pre-trained image classification network is shown a few additional images from a new domain.

In operation, during polishing of product substrates, the images are fed into the neural network 210. The output of the neural network 210 is used in real-time to associate each measured spectrum with a classification of the portion of the substrate from which the spectrum was obtained.

The image classification by the convolutional neural network can be concatenated with the measured spectrum before be being fed into another model which is used for thickness estimation or prediction.

The classification can be used by the conversion algorithm module 220. For example, the controller 90 may store a plurality of libraries of reference spectra with each reference spectrum having an associated measurement value, e.g., an index value. The controller 90 can select one of the libraries based on the classification received from the neural network 210. Then the reference spectrum from the selected library that best matches the measured spectrum can be determined, e.g., by finding the reference spectrum with the smallest sum of squared differences relative to the measured spectrum. The index value for the best-matching reference spectrum can then be used as the measurement value.

EXAMPLE 2

The in-situ monitoring system 100 can be an eddy current monitoring system. The sensor 100*a* of the eddy current monitoring system and sensor of the in-situ imaging system 150 are co-located, e.g., positioned in the same recess in the platen. The line scan camera of the in-situ imaging system 150 generates a time synchronized image that covers the entire sweep of the sensor 100*a* across the substrate.

The machine vision system 200 can include a convolutional neural network (CNN) 210. To train the neural network 210, the geometry (e.g., position, size and/or orientation) of substrate features that effect current flow (e.g., a guard ring) can be manually identified. The images and the geometry values from the reference substrates can then be input to the neural network in a training mode, e.g., using backpropagation, to train the neural network 210 as a feature geometry reconstructor.

In operation, during polishing of product substrates, the images are fed into the neural network 210. The output of the neural network 210 is used in real-time to associate each measured value from the eddy current monitoring system with a geometry value for the portion of the substrate from which the image was obtained.

The geometry values generated by the neural network 210 can be used by the conversion algorithm module 220. A map from eddy current signal to resistance is dependent on the relative orientation and location of features on the substrate. For example, a sensitivity of the sensor 100*a* to a conductive loop on the substrate can depend on an orientation of the loop. The controller 90 may include a function that calculates a gain based on the geometry value, e.g., the orientation. This gain can then be applied to the signal, e.g., the signal value can be multiplied by the gain. Thus, the geometry value can be used to adjust how the eddy current sensor data is interpreted.

CONCLUSION

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a machine-readable storage media, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The above described polishing apparatus and methods can be applied in a variety of polishing systems. Either the polishing pad, or the carrier heads, or both can move to provide relative motion between the polishing surface and the substrate. For example, the platen may orbit rather than rotate. The polishing pad can be a circular (or some other shape) pad secured to the platen. The polishing system can be a linear polishing system, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used relative orientation or positioning of the components; it should be understood that the polishing surface and substrate can be held in a vertical orientation or some other orientation with respect to gravity.

Although the description above has focused on chemical mechanical polishing, the control system can be adapted to other semiconductor processing techniques, e.g., etching or deposition, e.g., chemical vapor deposition. Rather than a line scan camera, a camera that images a two-dimensional region of substrate could be used. In this case, multiple images may need to be combined.

Particular embodiments of the invention have been described. Other embodiments are within the scope of the following claims.

What is claimed is:

1. A polishing system, comprising:
   a support to hold a polishing pad;
   a carrier head to hold a surface of a substrate in contact with the polishing pad;
   a motor to generate relative motion between the support and the carrier head;
   an in-situ monitoring system to generate a signal comprising a sequence of raw signal values that depends on a thickness of a layer in a measurement spot on the substrate;
   an in-situ imaging system to generate an image of at least the measurement spot of the substrate at substantially the same time as the in-situ monitoring system generates the signal for the measurement spot on the substrate; and
   a controller configured to
      receive the image from the in-situ imaging system,
      receive the signal from the in-situ monitoring system,
      determine a characterizing value relating to an orientation of the substrate in a portion of the image corresponding to the measurement spot by using machine vision processing of the image to generate the characterizing value,
      perform a conversion of the sequence of raw signal values of the signal from the in-situ monitoring system into a sequence of thickness values for the measurement spot by providing the sequence of raw signal values and the characterizing value as input to a conversion algorithm wherein the characterizing value influences the conversion of the sequence of raw signal values to the sequence of thickness values, and wherein each thickness value of the sequence of thickness values represents a thickness of the layer in the measurement spot, and
      at least one of halt polishing of the substrate or adjust a polishing parameter based on the thickness value.

2. The system of claim 1, wherein the machine vision processing comprises an artificial neural network.

3. The system of claim 2, wherein the machine vision processing comprises a convolutional neural network.

4. The system of claim 2, wherein the controller is configured to train the artificial neural network by backpropagation using training data including images and known characterizing values for the images.

5. The system of claim 1, wherein the in-situ monitoring system comprises an eddy current monitoring system to generate a signal value for the measurement spot.

6. The system of claim 1, wherein the controller is configured to determine a portion of the image that corresponds to the measurement spot.

7. The system of claim 6, wherein the controller is configured to synchronize image data from the in-situ imaging system with signal values from the in-situ monitoring system.

* * * * *